US006827911B1

(12) United States Patent
Gering

(10) Patent No.: US 6,827,911 B1
(45) Date of Patent: Dec. 7, 2004

(54) PHOTOREACTOR WITH SELF-CONTAINED PHOTOCATALYST RECAPTURE

(75) Inventor: Kevin L. Gering, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 772 days.

(21) Appl. No.: 09/708,963

(22) Filed: Nov. 8, 2000

(51) Int. Cl.[7] .......................... B01J 19/12; B01D 12/00; F27B 15/00

(52) U.S. Cl. .................. 422/186.3; 422/145; 422/265; 422/269; 209/163; 209/173; 209/155

(58) Field of Search .............................. 422/186.3, 145, 422/265, 269; 209/163, 173, 155

(56) References Cited

U.S. PATENT DOCUMENTS

| | | | |
|---|---|---|---|
| 3,906,927 A | 9/1975 | Caplan ........................ | 126/270 |
| 4,883,340 A | 11/1989 | Dominguez .................. | 350/260 |
| 5,118,422 A | * 6/1992 | Cooper et al. .............. | 210/636 |
| 5,650,051 A | 7/1997 | Wada et al. ........... | 204/157.52 |
| 5,779,912 A | * 7/1998 | Gonzalez-Martin et al. | 210/748 |
| 5,999,323 A | 12/1999 | Wood .......................... | 359/591 |
| 6,037,535 A | 3/2000 | Yoshino ...................... | 136/246 |
| 6,251,264 B1 | * 6/2001 | Tanaka et al. ............. | 210/96.1 |

OTHER PUBLICATIONS

Jackson, N.B., et al., "Attachment of $TiO_2$ Powders to Hollow Gas Microbeads: Activity of the $TiO_2$ –Coated Beads in the Photoassisted Oxidation of Ethanol to Acetaldehyde," *Journal of the Electrochemical Society*, vol. 138, No. 12, 12/91, pp. 3660–3664.

Tseng, J., et al., "Photocatalytic Oxidation Process for the Treatment of Organic Wastes," *Chemical Oxidation*, Proceedings of the First International Symposium Chemical Oxidation: Technology for the Nineties, Feb. 20–22, 1991, pp. 262–277.

Rosenberg, J., et al., "Collection Optics of $TiO_2$ Photocatalyst on Hollow Glass Microbeads Floatin on Oil Slicks," *Journal of Physical Chemistry*, vol. 96, No. 8, 1992, pp. 3423–3428.

Matthews, R. W., "Purification of Water with Near–U.V. Illuminated Suspensions of Titanium Dioxide," *Wat. Res.*, vol. 24, No. 5, pp. 653–660, 1990.

Venkatadri, R., et al., "Chemical Oxidation Technologies: Ultraviolet Light/Hydrogen Peroxide, Fenton's Reagent, and Titanium Dioxide–Assisted Photocatalysis," *Hazardous Waste & Hazardous Materials*, vol. 10, No. 2, pp. 107–149, 1993.

(List continued on next page.)

*Primary Examiner*—Steven Versteeg

(57) ABSTRACT

A system for the continuous use and recapture of a catalyst in liquid, comprising: a generally vertical reactor having a reaction zone with generally downwardly flowing liquid, and a catalyst recovery chamber adjacent the reaction zone containing a catalyst consisting of buoyant particles. The liquid in the reaction zone flows downward at a rate which exceeds the speed of upward buoyant migration of catalyst particles in the liquid, whereby catalyst particles introduced into the liquid in the reaction zone are drawn downward with the liquid. A slow flow velocity flotation chamber disposed below the reaction zone is configured to recapture the catalyst particles and allow them to float back into the catalyst recovery chamber for recycling into the reaction zone, rather than being swept downstream. A novel 3-dimensionally adjustable solar reflector directs light into the reaction zone to induce desired photocatalytic reactions within the liquid in the reaction zone.

20 Claims, 6 Drawing Sheets

OTHER PUBLICATIONS

Hsiao, C.Y., et al., "Heterogeneous Photocatalysis: Degradation of Dilute Solutions of Dichloromethane ($CH_2Cl_2$), Chloroform ($CHCl_3$), and Carbon Tetrachloride ($CCl_4$) with Illuniated $TiO_1$ Photocatalyst," *Journal of Catalysis*, 82, pp. 418–423, 1983.

Prairie, M. R., et al., "Evaluation of the Treatment of Metal–Edit Complexes using $TiO_2$ Photocatalysis," *Solar Engineering*, pp. 71–78, 1996.

Koval, C., et al, "Solar Hydrogen Production".

"Titanium dioxide photocatalysis: Treatment hype or hope?" *Environmental Science & Technology/News*, vol. 30., No. 7, p. 284A, 1996.

Serpone, N., et al., "AM1 Simulated Sunlight Photoreduction and Elimination of Hg(II) and $CH_3$Hg(II) Chloride Salts from Aqueous Suspensions of Titanium Dioxide," *Solar Energy*, vol. 39, No. 6, pp. 491–498, 1987.

Prairie, M. R., et al., "An Investigation of $TiO_2$ Photocatalysis for the Treatment of Water Contaminated with Metals and Organic Chemicals," *Environmental Science Technology*, vol. 27, No. 9, pp. 1776–1782, 1993.

Imadojemu, H.E., "Literature Survey of Concentrating Solar Collectors," The American Society of Mechanical Engineers, pp. 719–730 1995.

* cited by examiner

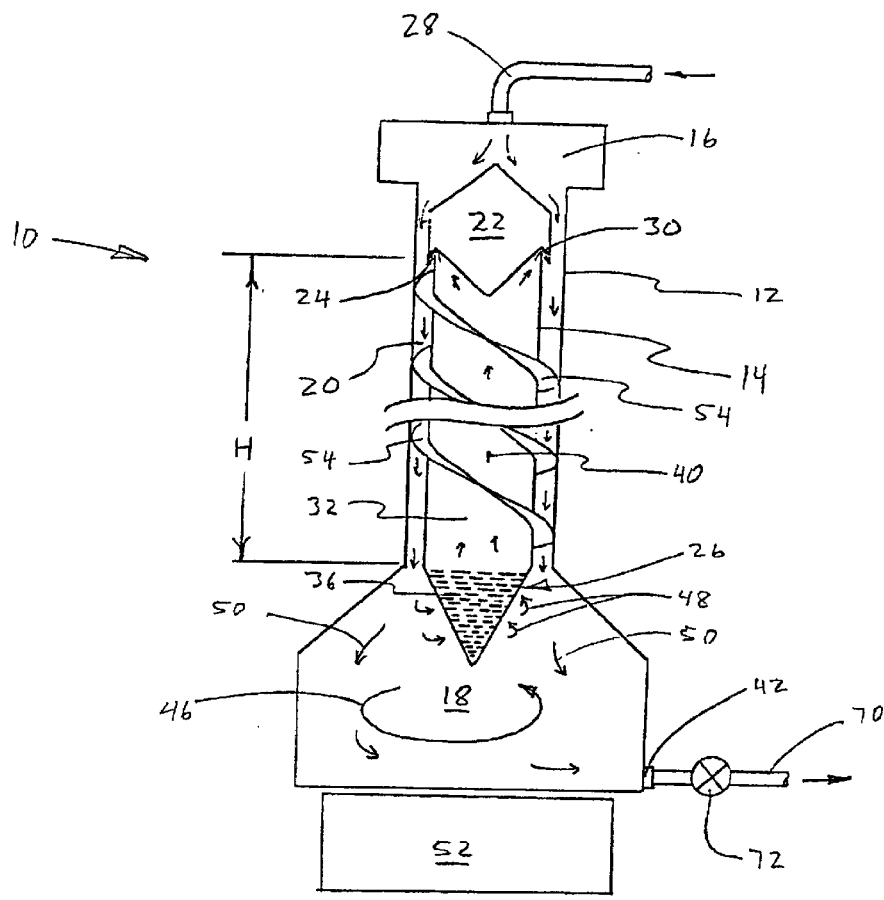
FIG. 1
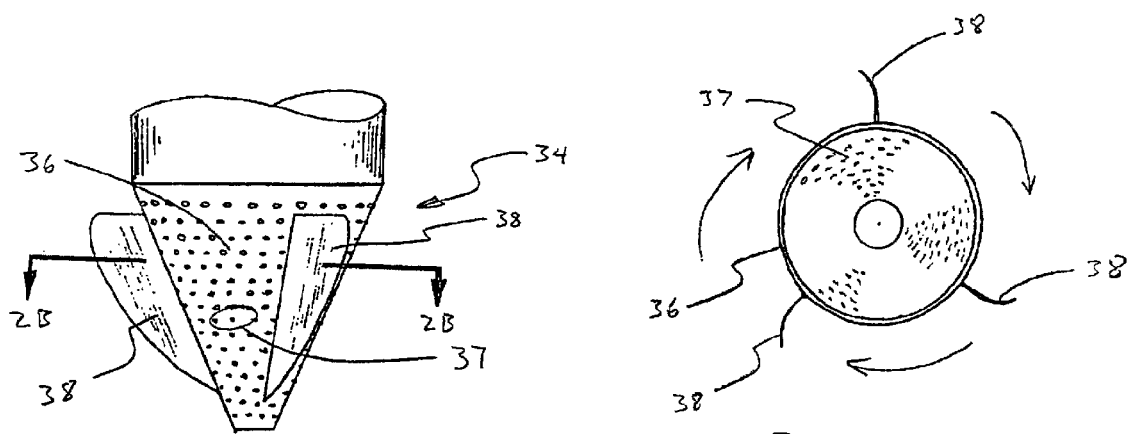
FIG. 2A
FIG. 2B

PHOTOREACTOR WITH SELF-CONTAINED PHOTOCATALYST RECAPTURE

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

This invention relates to systems for promoting photocatalytic reactions. More particularly, the present invention relates to a reactor for causing photocatalytic reactions in a liquid, and then recapturing the photocatalyst by exploiting the upward buoyancy of the photocatalyst in relation to the liquid.

2. State of the Art

The value and importance of photocatalytic processes are well known, and research into new and better photocatalysts and their uses is ongoing throughout the world. There are many photocatalytic and photochemical mechanisms that have been found to be beneficial in a wide range of applications. For example, through photocatalysis, treatment of organic and inorganic contaminants in water is possible, management of chemical reagents within a process can be improved, and many chemical synthesis/manufacturing processes have been made possible which were either not possible or practical before.

Although the ability to promote photocatalytic reactions is well established, the feasibility of using these processes for practical water treatment, industrial processes, or chemical synthesis has been elusive due to the challenges associated with processing and handling finely dispersed semiconductor photocatalyst materials in liquid. Use of such photocatalyst suspensions is often impractical because of the economic constraints of either sacrificing the photocatalyst (i.e. allowing disposal downstream) or recapturing it in difficult filtration and recycling steps.

Heretofore, photoreactors based on photocatalyst suspensions have difficulties providing both high oxidation efficiencies and acceptable processing flowrates while achieving economical management of the photocatalyst. In addition, some water treatment scenarios may mandate that the treated water be filtered prior to release to remove suspended solids in order to satisfy turbidity and clarity criteria.

It would thus be desirable to have an efficient photoreactor which both prevents the uneconomical loss of photocatalyst, while avoiding expensive and complicated filtration systems.

In concert with a photoreactor, some method of reflecting and concentrating light, typically sunlight, is generally desirable to promote higher efficiency in photochemical reactions. Although solar technologies in general have proliferated into niche areas in geographic regions where they are economically competitive, further research, development, refinement, and growth of these technologies is needed to make them more attractive and effective in locations that are not as amenable to solar technologies. One area that could benefit from additional development as that of solar collector/reflector devices. These devices act to capture solar energy through a large-surface mirrored area and reflect it back to a target area much smaller than the mirror. The net effect of solar collector and reflector devices is that solar energy may be concentrated far beyond the natural incident solar radiation and directed at a specific target. The inventor has found that there is a lack of such devices for vertically oriented targets (VOT's), such as column-type reaction vessels, heat exchange pipes that depend upon thermosyphon operation, etc. Most prior solar reflector devices, such as horizontally oriented trough collectors, present limitations such as having a fixed reflective surface, and limited adjustability and mobility.

It would therefore be desirable to have a solar collector/reflector which is mobile and provides a reflective surface having an adjustable contour to accommodate the shape and dimensions of the target, and which is also angularly adjustable to optimize its position relative to the sun and the target.

SUMMARY OF THE INVENTION

It is therefore an advantage of the present invention to provide a photoreactor which manages and recycles a photocatalyst through control of hydraulic and buoyant forces.

It is another advantage of this invention to provide a photoreactor with a liquid-phase photocatalyst suspension which does not require downstream auxilliary equipment to recapture or filter out the photocatalyst.

It is another advantage of this invention to provide a photoreactor which allows good quantum efficiencies, while reducing the mass of photocatalyst which is required to promote photocatalytic reactions.

It is another advantage of this invention to provide a solar collector/reflector with an adjustable contour reflective surface to accommodate the shape and dimensions of a vertically oriented target.

The above and other advantages are realized in a system for the continuous use and recapture of a catalyst in liquid, comprising: a reactor having a reaction zone with generally downwardly flowing liquid, and a catalyst recovery chamber adjacent the reaction zone containing a catalyst consisting of buoyant particles. The liquid in the reaction zone flows downward at a rate which exceeds the speed of upward buoyant migration of catalyst particles in the liquid, whereby catalyst particles drawn out of the catalyst recovery chamber and introduced into the liquid in the reaction zone are drawn downward with the liquid. A flotation chamber disposed below the reaction zone is configured such that when the flowing liquid enters therein the liquid flow velocity drops, allowing the buoyancy of the catalyst particles to cause them to flow back into the catalyst recovery chamber, rather than being swept downstream.

In one illustrative embodiment, the photoreactor comprises a generally upright outer cylinder; with an inner cylinder disposed inside and generally coaxially with the outer cylinder, so as to define an annular reaction zone between the inner and outer cylinders. The inner cylinder comprises inlets at its bottom for allowing inflow of buoyant photocatalyst-coated microspheres, and an orifice disposed at its top for allowing outflow of the photocatalyst microspheres into the downwardly flowing liquid in the reaction zone. A flotation chamber is disposed at the bottom of the outer cylinder and is configured to substantially reduce the flow velocity of the liquid upon exiting the reaction zone, such that the buoyant microspheres are allowed to float upward through inlets of the inner cylinder. The flotation chamber may also include a means for forming a vortex in the liquid, such that the buoyant particles are further directed toward the inlets of the inner cylinder. A photoreflector is provided for directing light into the reaction zone, whereby the photocatalyst disposed on the microspheres induces desired chemical reactions within the liquid while flowing through the reaction zone.

The invention provides an economical and practical photoreactor which is useful for a wide variety of solar photocatalytic uses such as, for example, remediation of ground and surface waters, production of hydrogen and oxygen from water, recycling of costly chemical reagents such as chelating or complexing agents, as well as non-solar photocatalytic precesses which require specific wavelengths of light in concentrated form, such as, for example, chemical processes driven by lower UV wavelengths, such as less than 300 nm. Other advantages and features of the present invention will be apparent to those skilled in the art, based on the following description, taken in combination with the accompanying drawings.

BRIEF DESCRIPTION OF THE DRAWINGS

FIG. 1 is a cross-sectional view of the photoreactor according to the present invention;

FIG. 2A is a closeup side view of an alternative inlet cone configured for use with the photoreactor of FIG. 1;

FIG. 2B is a horizontal cross-sectional view of the alternative inlet cone of FIG. 2A;

DETAILED DESCRIPTION OF THE INVENTION

Figure 3:
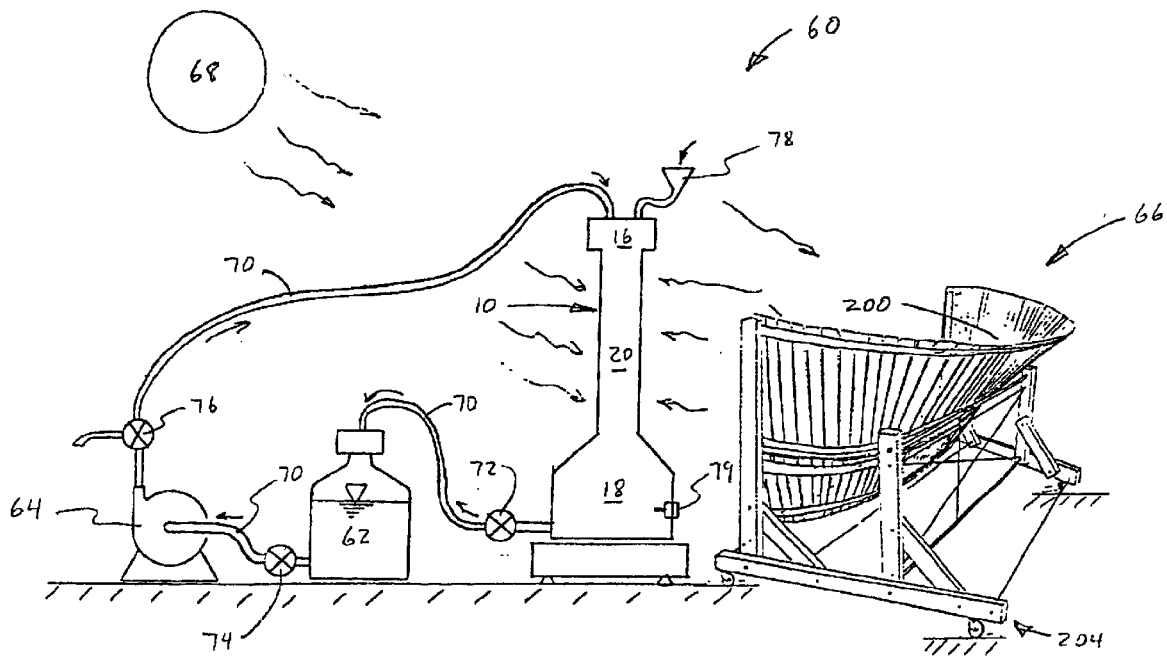
FIG. 3 depicts a complete photocatalytic system configured for use with the photoreactor of the present invention.

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

FIG. 1 is a cross-sectional view of a photoreactor 10 according to the present invention. The photoreactor 10 generally comprises an outer cylinder 12, an inner cylinder 14 disposed coaxially within the outer cylinder, an inlet chamber 16 at the top, and a flotation chamber 18 at the bottom. The annular space between the inner and outer cylinders forms a reaction zone 20 having a height H. The inner space of the inner cylinder 14 comprises a catalyst recovery chamber 32. At the top of the inner cylinder is a distributor cap 22 which forms an orifice 24 about the top of the inner cylinder which allows fluid communication between the catalyst recovery chamber 32 and the reaction zone 20. At the bottom of the inner cylinder is an inlet 26 which allows restricted fluid communication between the flotation chamber and the catalyst recovery chamber. The inlet 26 preferably comprises an inverted perforated cone, which will be described in more detail below.

The photoreactor 10 operates in a flow-down configuration, with the liquid stream (e.g. water) entering through a conduit 28 connected to the inlet chamber 16 in the top of the reactor, and flowing downward through the annular reaction zone 20. A photocatalyst solution comprising buoyant photocatalyst-coated beads dispersed in the liquid is drawn out of the catalyst recovery chamber 32 in the inner cylinder 14 through the orifice 24 due to a venturi/siphoning effect, and the catalyst beads are drawn down through the reaction zone by the flow of the liquid. Upon reaching the bottom of the reaction zone, the flow enters the flotation chamber, where, due to its larger dimension, the flow velocity slows, allowing the buoyant force of the pbotocatalyst beads to cause them to float upward through the inlet 26 of the inner cylinder 14, where the beads continue to float upward in the catalyst recovery chamber 32 until they reach the distributor cap 22, ready to be recycled into the reaction zone. Some concurrent upward fluid flow occurs to assist catalyst recovery, based upon the outflow of fluid at the orifice 24 due to the above-mentioned siphoning effect.

The reaction zone 20 is preferably about ⅛ inch thick, this thickness being primarily dependent upon the opacity of the liquid and the need for light to pass through the liquid to allow complete exposure. The thickness of the reaction zone also affects hydraulic parameters, such as the downward velocity of the liquid and the related velocity of the microspheres. The outer cylinder 12 of the photoreactor may be formed of any suitably rigid and transparent material which is resistant to the chemicals to be encountered in the reactor. For use of the reactor for the degradation of cyanide in water, the inventor used a Type L Teflon FEP (fluorinated ethylene propylene) outer cylinder. This material has excellent transparency to near-UV and visible light, and is chemically resistant to most if not all of the liquid phase constituents expected in cyanide contaminated water. It is also strong, rigid, and resistant to abrasion. The dimensions of the outer cylinder will vary depending upon the application. The outer cylinder used by the inventor was 3.5 inches in diameter, and configured such that the height H of the reaction zone was approximately 32–34 inches. As discussed below, these dimensions provided a suitably long residence time in the reaction zone to allow the desired reactions.

The inner cylinder 14 is somewhat shorter than the outer cylinder 12, and has a diameter approximately ¼ inch less than the outer cylinder in order to create the ⅛" annular reaction zone. The inner cylinder is made of rigid polystyrene that is preferably provided with a reflective coating, such as Silverlux SA-85P reflective film made by 3M Corporation. Materials other than polystyrene could be used so long as they are suitably rigid and inert.

The flotation chamber 18 is preferably formed of a rigid, inert polymer. For the trial run (discussed below) involving the photocatalytic degradation of cyanide in water, the inventor used a flotation chamber made of clear polycarbonate material having a very low transmittance (<2%) to UV wavelengths. This was done to restrict the incidence of effective light, and thereby restrict photocatalytic reactions, to the reaction zone, to thereby allow accurate appraisal of the effectiveness of the reactor itself. It will be apparent that alternate design and dimensional specifications may be used for the photoreactor to accommodate other applications. For example, beneficial variations could be realized for the length and diameter of the reaction zone, the reaction zone/annulus thickness, choice of constructions materials, etc.

The photocatalyst solution comprises an aqueous dispersion of hollow ceramic microspheres which are coated with a photocatalyst, such as zinc oxide (ZnO), titanium dioxide ($TiO_2$), or other semiconductor photocatalysts or photosensitive materials. The photocatalyst used by the inventor for the degradation of cyanide in water was Degussa P-25 $TiO_2$. It will be apparent that various photocatalysts may be selected for various chemical applications. The substrate of the microspheres is type SLG hollow ceramic microspheres made by PQ Corporation. The microspheres have diameters of from about 100 $\mu$m to about 300 $\mu$m. However, this preferred size may vary depending upon the specific catalyst selected and the liquid and other chemical and physical factors involved in the specific reactor setup.

The $TiO_2$ coating comprises about 20% to 30% of the weight of the coated microspheres. The procedure for coating the ceramic microspheres with $TiO_2$ is known by those skilled in the art, and is thoroughly discussed in Jackson, N. B. et al., *Attachment of TiO₂ Powders to Hollow Glass Microbeads: Activity of the TiO₂-Coated Beads in the Photoassisted Oxidation of Ethanol to Acetaldehyde,* Journal of the Electrochemical Society, Vol. 138 No. 12 (1991). The coated microspheres are formed to have a specific gravity of preferably about 0.7 to 0.8. It will be apparent that microspheres with a different specific gravity may be selected depending upon the liquid to be introduced into the reactor, the flow rate, etc.

As the liquid flows down through the reaction zone 20 under gravity flow at approximately ambient temperature and pressure, the photocatalyst solution enters the top of the reaction zone through the orifice 24 and mixes with the downward flowing liquid. The photocatalyst solution is drawn through the orifice partly due to a venturi/siphoning effect which is created at the lip 30 of the distributor cap 22. The mixture of liquid and catalyst solution is carried downward due to the downward flow velocity of the liquid in the reaction zone. The hydraulics of the photoreactor are specifically designed such that the upward buoyant force of the microspheres in the solution is more than countered by the downward flow of the liquid. While the photocatalyst is present and dispersed in the liquid in the reaction zone, the light entering the reaction zone causes intended photocatalytic reactions in the liquid. Fluid flow through the reaction zone also produces mild turbulence among the microspheres, so as to minimize diffusion-limited reaction rates.

Upon leaving the reaction zone 20, the mixture of liquid and photocatalyst solution enters the flotation chamber 18. The flotation chamber is configured to significantly reduce the downward flow velocity of the mixture, allowing the upward buoyant force of the microspheres to overcome the downward flow velocity of the liquid. In the photoreactor constructed and tested by the inventor, the flotation chamber had a volume of approximately 10 liters. As the liquid slows, the microspheres begin to float upward, toward the inlet 26 disposed at the bottom of the inner cylinder 14, allowing passage into the catalyst recovery chamber 32 within the inner cylinder.

The inlet 26 is preferably a downwardly oriented perforated cone formed of high density polyethylene (HDPE), with perforations large enough to admit the microspheres. A closeup view of one embodiment of an inlet 34 is given in FIG. 2A. The inlet generally comprises an inverted conical body 36 having a plurality of perforations 37 formed therein. The inlet 34 may also have radially extending vanes or fins 38 which help direct the microspheres toward the openings in the cone, as described below.

Upon entering the catalyst recovery chamber 32 in the inner cylinder 14, the microspheres continue their upward buoyant migration, dsignated by arrows 40 in FIG. 1, until reaching the distributor cap 22 at the top of the catalyst recovery chamber, where they are again siphoned out through the orifice 24, and into the liquid flowing downwardly into the reaction zone 20.

The liquid in which the desired chemical reaction has occurred exits the flotataion chamber 18 through outlet 42 and conduit 70, which are attached near the bottom of the flotation chamber. It will be apparent that the flow rate of liquid out of the reactor should be equal to the flow rate of liquid entering the reactor so as to prevent excessive pressurization or depletion of the liquid within the system. The inventor has found that the optimal range of liquid flow rates for the prototype system configured for detoxifying cyanide in water was from approximately ¼ to 2 gallons per minute. It will be apparent that the hydraulic flow characteristics will need to be independently calculated for any given system configuration and chemical combination to provide the desired flow rate, velocity, etc.

It will also be apparent that it is desirable to assist the microspheres in migrating toward the perforated cone. Mere upward force does not necessarily direct them to the inlet 26. Accordingly, a moderate centripetal flow pattern or vortex, denoted by arrow 46, is produced within the flotation chamber 18 to increase the separation and recycle efficiency for removing the microspheres from the bulk liquid phase. Because the microspheres are buoyant (having specific gravities of approximately 0.7 to 0.8), they tend to gravitate toward the center of the vortex-type flow pattern, as indicated by arrows 48, whereas the liquid (such as water, having a specific gravity of 1.0) migrates toward the outside region of the vortex, as indicated by arrows 50. The inventor has found that by forming a vortex around the perforated cone, the buoyant microspheres concentrate toward the center of the flotation chamber 18. It will be apparent that the extent of the vortex that is required will depend upon the dimensions of the flotation chamber, the flowrate of the liquid through the system, the liquid density, and the population and size distribution of the microspheres at the various specific gravities. A mild vortex pattern (20 to 60 rpm) has been found to achieve the desired result for the range of process flowrates, and may allow greater processing flowrates to be realized.

The desired vortex is produced by a large magnetic stirrer 52 disposed below the flotation chamber. An optional or additional method of achieving the desired vorticular flow pattern within the flotation chamber is to provide helical or spiral vanes 54 within the annular reaction zone 20, which cause the downwardly flowing liquid to obtain a circular or spinning flowing motion upon exiting the reaction zone. Hydraulic tests performed by the inventor have shown that the magnetic stirrer used alone produced satisfactory results, causing a vortex which contained a high percentage of the microspheres.

FIG. 3 depicts a complete photocatalytic system 60 configured for use with the photoreactor 10 of the present invention. The system generally comprises a reservoir 62, a pump 64, the photoreactor 10, a solar collector/reflector 66 for directing light from the sun 68 into the reaction zone, and tubing 70 for directing the fluid to the various parts of the system. An outlet flow control valve 72 is provided at the outlet of the flotation chamber 18, and a similar valve 74 is provided at the outlet of the reservoir. A sampling valve 76 is also provided to allow fluid to be extracted from the system during operation to test the efficiency of the system. A photocatalyst fill line 78 may also be connected to the inlet chamber 16 to allow addition of photocatalyst at any time, whether before or during operation of the photoreactor.

Fluid is moved through the system via the pump 64, which introduces liquid into the inlet chamber 16 in the top of the reactor. From that point, fluid moves via gravity-induced flow. The inventor has used a peristaltic pump for the pumping function, though other pump types may be used. The prototype photocatalytic system 60 of FIG. 3 also includes a temperature probe 79 disposed within the flotation chamber 18, for allowing measurement of the temperature of the liquid as it flows through the system. It will be apparent that the temperature probe may be placed at other locations in the system, and that multiple temperature probes may be installed at different locations for more accurate measurement, if desired.

A case study was performed using the photoreactor system of FIG. 3 with a solution of mock wastewater containing $K_4Fe(CN)_6$, a highly stable cyanide-metal complex, in water. The stability constant of this ferrous complex has been published at values ranging from $10^{35.4}$ to $10^{47}$. See Huiatt, J. L., et al., "Cyanide From Mineral Processing", workshop proceedings, sponsored by National Science Foundation, and U.S. Bureau of Mines (1983). In the case study, the concentration of the $Fe(CN)_6^{4-}$ ion was such that there was a theoretical equivalency of 10 mg/L $CN^-$, assuming complete dissociation of the cyanide-metal complex.

The mock wastewater had an initial volume of 30 liters, and a pH of 11.5 to 11.8. Photocatalysis was promoted using a very low initial dose of 100 to 105 grams of photocatalyst (approximately 0.13% $TiO_2$ by weight) for the overall mock wastewater solution volume. An additional 60 grams of photocatalyst were added at t=90 min., this addition being represented by the vertical dashed line 80 in FIG. 4. The operational flow rate for the trial run was 1 gallon per minute (gpm) per reactor pass, which produced an observed residence time of between 6 and 7 seconds for the microspheres moving through the reaction zone. A net irradiation time of between 3 and 4 minutes was accomplished for the trial run, this time interval representing the total elapsed time of residence of the solution within the reaction zone.

Figure 4:
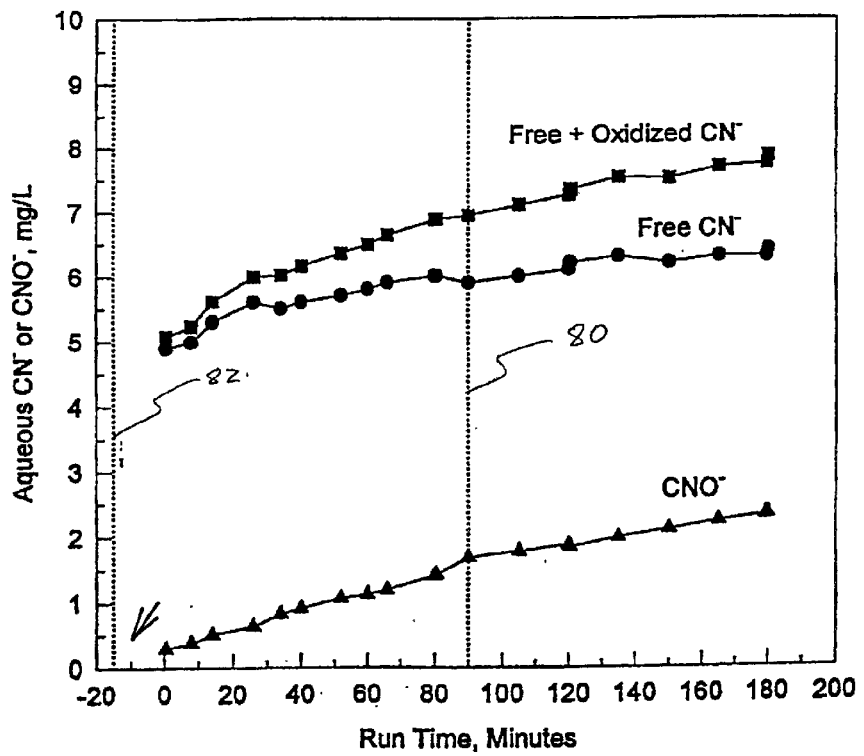
FIG. 4 is a graph of performance data for the photoreactor during a trial run to treat cyanide-laden water.

Samples of the solution were taken during the test ran and were analyzed for cyanide ($CN^-$) and cyanate ($CNO^-$), an oxidized, stable form that is far less toxic than cyanide. The analyses showed favorable destruction of the cyanide complex during the trial run, followed by oxidation of a portion of the resultant aqueous free cyanide. FIG. 4 is a graph of performance data from the test run of the photoreactor. This graph shows the relative levels of cyanide and cyanate levels during the test run. The initial concentration of free cyanide (at time zero) was due to natural decomposition prior to the run and photo-dissociation of easier or less stable CN—Fe ligands during the initial preparatory period (approximately 15–20 min., beginning at the second vertical dashed line 82 at the far left of FIG. 4) immediately preceding time zero, when the solution was flowing through the system in open sunlight while the solar reflector 66 was covered.

FIG. 4 shows that there was a steady increase in the free cyanide ($CN^-$) concentration (indicating good photo-dissociation of the cyanide-metal complex) and there was a corresponding steady increase of cyanate ($CNO^-$) due to cyanide oxidation through photocatalysis. The net cyanide (detected $CN^-$ plus that which had been oxidized) also increased throughout the run, reaching nearly 8 mg/L (i.e. 80% of the possible 10 mg/L) by the end of the trial. In other words, the test run showed that the photoreactor effectively destroyed approximately 80% of the cyanide complex through photodissociation, followed by oxidation of a portion of the resultant aqueous free cyanide.

The test run also indicated that the operational characteristics of the photoreactor could be improved and refined, particularly from a hydraulic standpoint. For example, it was noted that during hydraulic testing and during the test run that a small quantity of the photocatalyst medium had flowed out of the flotation chamber 18 with the treated water, and into the reservoir 62. The inventor believes that slight modifications to the position and configuration of the perforated cone 36 should improve the efficiency of photocatalyst recycling within the photoreactor 10. As noted above, it will be apparent that alternate design, dimensional, and operational specifications may be used for the photoreactor to accommodate other applications. For example, variations in the length and diameter of the reaction zone, the annulus thickness, the flotation chamber dimensions, choice of constructions materials, and operating parameters (e.g. liquid flowrate and photocatalyst dosage) may be beneficial, depending upon the application.

Figure 5:
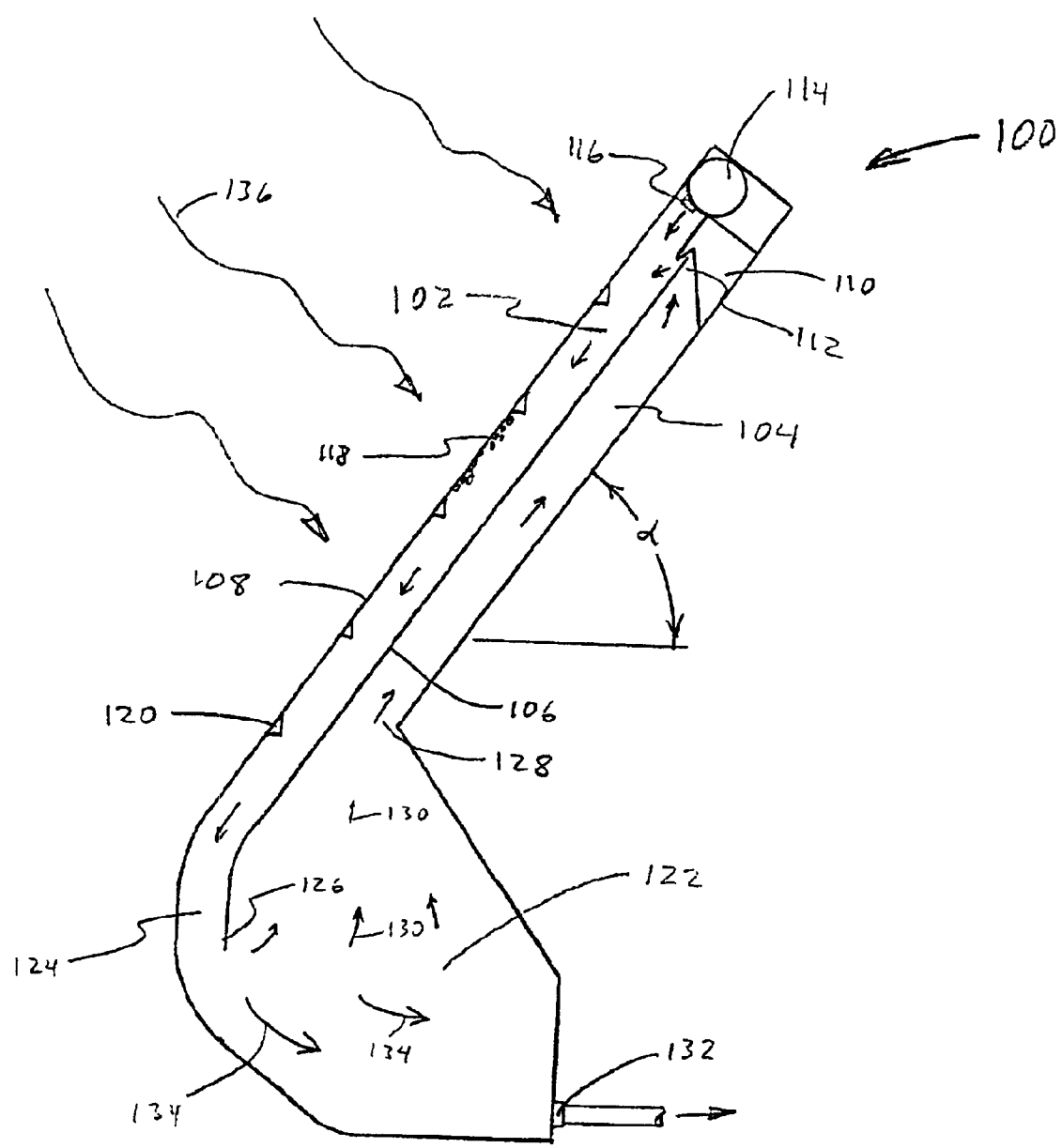
FIG. 5 is a cross-sectional view of an alternative embodiment of the photoreactor of the present invention.

FIG. 5 is a cross-sectional view of an alternative embodiment of the photoreactor of the present invention. In this embodiment, the photoreactor 100 is non-cylindrical, but instead is formed as a generally flat panel which is oriented in a non-vertical configuration, at some angle α relative to the horizon. The reactor comprises a reaction zone 102 and a catalyst recovery chamber 104, which are separated by a wall 106, which may have a reflective coating disposed thereon, similar to that disclosed above with respect to the inner cylinder 14 (FIG. 1). A layer of glass 108 or other suitable transparent material provides a top cover to the reaction zone, thus allowing adequate light of the appropriate wavelengths for the desired photochemical reactions in the reaction zone.

A distributor cap 110 is disposed at the top of the catalyst recovery chamber 104, and forms an orifice 112 at the top of the wall 106 to allow catalyst to flow out of the catalyst recovery chamber into the top of the reaction zone 102. A liquid delivery device, such as a pipe 114 with an outlet 116, delivers liquid to the top of the reaction zone. As the liquid flows down past the orifice, the catalyst solution is drawn out of the catalyst recovery chamber due to a slight venturi/siphoning effect. As described above, the flow rate of the liquid is selected such that the downward flow velocity exceeds the upward buoyant force of the microspheres.

One of the foremost issues of any photoreactor design is the degree of mixing or intimacy between the liquid and the photocatalyst particles. Because the reactor 100 is not vertical, the buoyant microshperes will tend to "crawl" along the inside surface of the reactor glass 108, as indicated by the exaggerated size microshperes 118 shown congregated along a portion of the glass. This characteristic will tend to reduce the intimacy of the liquid and the photocatalyst due to stagnation (or near stagnation) of the particles against the outer wall of the reaction zone. Thus, while there may naturally be some turbulence in the downwardly flowing liquid, which will tend to mix the microspheres with the liquid, photochemical efficiency will tend to drop. One design feature which can help reduce stagnation and promote mixing is to keep the reaction zone thickness small, such as 2–3 mm, to exploit the buoyancy driven hydraulics.

To promote additional mixing, protuberances 120 may be formed on the inside surface of the glass 108. Other obstacles may also be provided in the reaction zone 102 in order to help disrupt the flow of the liquid and promote mixing. Finally, to further reduce migration problems with the photocatalyst particles, the angle α should preferably be maintained at from about 75° to 90° relative to the horizon. The system could be configured such that the angle α is adjustable, and varies to follow the sun for optimal solar exposure. However, it will be apparent that any change in α will tend to have a profound effect on the hydraulic characteristics of the system. Accordingly, it is considered undesirable to make α variable.

Beyond the lower end of the reaction zone 102 is a flotation chamber 122, which has a large size such that the velocity of the flowing liquid drops rapidly upon entering the flotation chamber. One of the benefits of the embodiment of FIG. 5 is that the creation of a centrifugal flow field is not needed within the flotation chamber. The lower portion 124 of the reaction zone curves downwardly, such that the lowest extremity 126 of the wall 106 is approximately vertical, or curves slightly past vertical, for any given angle α. With this configuration, when the liquid enters the flotation chamber and slows down, the upward buoyant force of the microspheres will cause them to begin to migrate upward toward the inlet 128 of the catalyst recovery chamber 104, as indicated by arrows 130. Because the lower end 126 of the wall 106 is vertical or past vertical, this upward tendency will not direct the microspheres back toward the lower end of the reaction zone. Meanwhile, the liquid will gradually flow toward the outlet 132 of the flotation chamber, as indicated by arrows 134. It will be apparent that the flotation chamber must be of a size such that the liquid slows sufficiently to allow the catalyst migrate upwardly, such that catalyst will not be swept downstream into the outlet 132.

The configuration of FIG. 5 provides several benefits. It is simple, and may not require a solar reflector, depending largely upon the selected angle α. Rather, the reactor may directly absorb incident solar radiation 136 for the desired photochemical reaction. However, concentrated solar energy could also be supplied using a series of conventional flat-plate reflectors. This configuration is believed not to be as desirable or efficient as the vertically oriented reactor configuration of FIGS. 1 and 3, unless the entire reflector/reactor system were configured to rotate to follow the sun, or a system of mirrors were employed. Nevertheless, the reactor provides for positive recapture of photocatalyst without the need for complicated filtration systems which tend to reduce the operating flow rate of the system as a whole.

Figure 6:
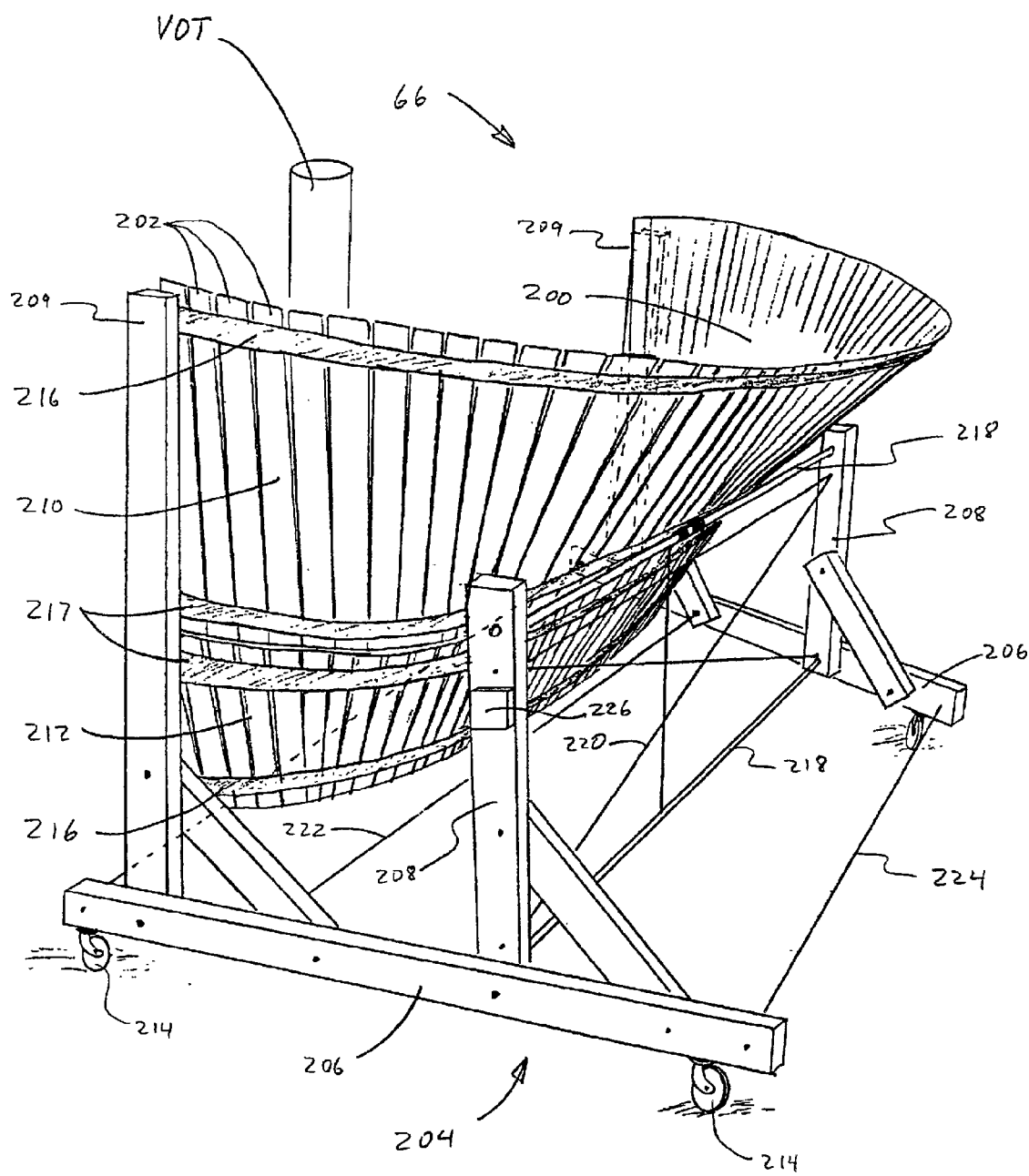
FIG. 6 is a closeup view of the novel vertically oriented adjustable reflector for use with the photoreactor of the present invention.

As depicted in FIG. 3, and shown more particularly in FIG. 6, the inventor has developed a vertically oriented variable contour solar collector/reflector 66 for use with the photoreactor of the present invention. The reflector 66 comprises a mosaic reflective surface 200 which provides true 3-dimensional adjustability. It can be adjusted in contour, tilt, and overall position to accommodate virtually any vertically oriented target (VOT) surface, regardless of its size and dimensions. As used herein, the term vertically oriented target (VOT) refers to an object having a height greater than its width. The VOT may be cylindrical, like the photoreactor of FIG. 1, or it may have any other shape or cross-section. Advantageously, the reflector 66 is mobile, compact, and can be used with solar or artificial light.

The reflector surface 200 comprises a plurality of generally vertical reflective plexiglass pieces 202 which are coated with a reflective film which has a high reflectance to light sources that are known to promote photo-catalytic reactions (e.g. solar energy in the UV and lower visible wavelengths). A preferred reflective film which is suitable for photocatalysis is Silverlux SA-85P made by 3M Corporation. Other reflective films may be more suitable for other applications of the reflector. For example, some applications may call for certain discrete wavelengths of light. Reflective films which reflect only certain wavelengths of light are available for such applications.

The individual reflector pieces 202 are preferably 2×24 inches ×⅜ inch thick coated plexiglass, laid side-to-side on a mobile, adjustable, rigid frame 204, which can be manipulated to yield various contours. The frame 204 generally comprises two side pieces 206, having rear vertical supports 208 and front vertical supports 209 extending upwardly therefrom on each side, which are pivotally interconnected by transverse rods 218. The transverse rods are preferably ¾ in. diameter metal pipe, and cross bracing, such as cables or rope lines 220, is provided between the side pieces 206 to increase the strength of the frame.

It will be apparent that the size and number of individual reflector pieces will depend upon the size of the VOT and the intensity of reflected light desired. As shown, the reflector 200 comprises two adjustable contour surfaces, an upper surface 210 and a lower surface 212, which are supported on the frame. The frame also includes casters 214 to make it mobile, and by virtue of its mobility, the entire device can be rotated axially around a VOT as shown in FIG. 7C, to maximize the amount of concentrated light reflected onto the VOT. As discussed below, the inventor has found that this reflector design has a theoretical maximum concentration factor of 10 for the photoreactor described above.

The maximum total number of reflector pieces 202 which are used will depend upon how many can be positioned on the framework for a given framework configuration. In the test run discussed above, the inventor used a reflector with 74 pieces, having a net reflective surface area of approximately 24 ft$^2$. It will be apparent that any number of reflector pieces may be used, depending upon the size of the VOT and the particular application. The width of the reflector pieces may vary, but should be selected such that the width of each reflector piece is less than the diameter or side dimension (in the case of a non-cylindrical VOT) of the VOT.

The reflector pieces 202 are connected to the framework 204 with a hook and loop type fastener system (e.g. Velcro®). This system comprises two nylon straps 216 (preferably 1.5 in. wide and 12 ft. long), one for each of the upper and lower contour surfaces, 210 and 212, the straps being covered with hook and loop material and extended transversely across the frame between the vertical supports 208. One strap supports the upper edge of the upper contour surface, and the other strap supports the lower edge of the lower contour surface. Corresponding hook and loop material (not visible) is connected to each reflector piece, to hold the pieces to the straps in a manner well known.

The lower edge of the upper contour surface and the upper edge of the lower contour surface are each supported by Velcro covered flexible rods 217. These rods are preferably formed of fiberglass that is ¼" wide and 8 ft. long, and provide a flexible yet rigid arc-like structure to support the contours. The rods 217 are attached to the front vertical support 209 with bolts, and are supported at midspan by the top transverse rod 218 which includes Velcro material where the flexible rod contacts the transverse rod.

The length of the nylon straps 216 can be adjusted to achieve a variety of contours for the contour surface 200, ranging from a deep semi-circular curve to a nearly flat contour. To do this, the framework side pieces 206 are pivoted about the ends of the rods 218 by selectively lengthening the front tension member 222 and shortening the rear tension member 224, or vice versa. This action either draws the ends of the nylon straps 216 and flexible rods 217 closer together, or extends them farther apart. By pivoting the frame and adjusting the length of the straps and flexible rods, a user can adjust both the contour and the net effective reflective surface area of the reflector. At the same time, the relative vertical angle of the reflective surface 200 will also change since the relative length of nylon straps 216 to the span between left and right front supports 209 will dictate the vertical orientation of the reflector pieces 202. The greatest reflective surface area is achieved by setting the framework pivot in a wide position, with tension member 222 long, and tension member 224 short.

Figure 7A:
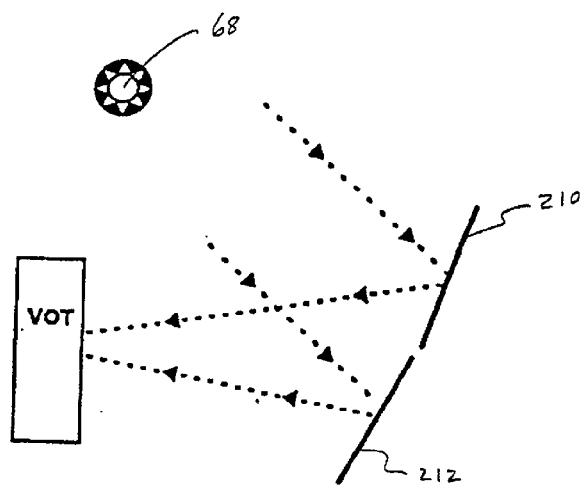
FIG. 7A is an elevation view of the solar reflector in relation to a VOT.
Figure 7B:
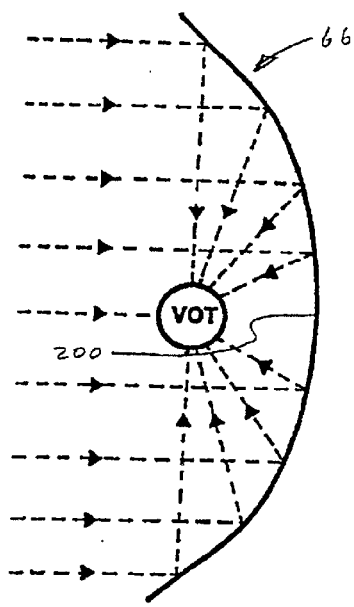
FIG. 7B is a plan view of the reflection pattern of the solar reflector about a VOT relative to incident solar radiation.
Figure 7C:
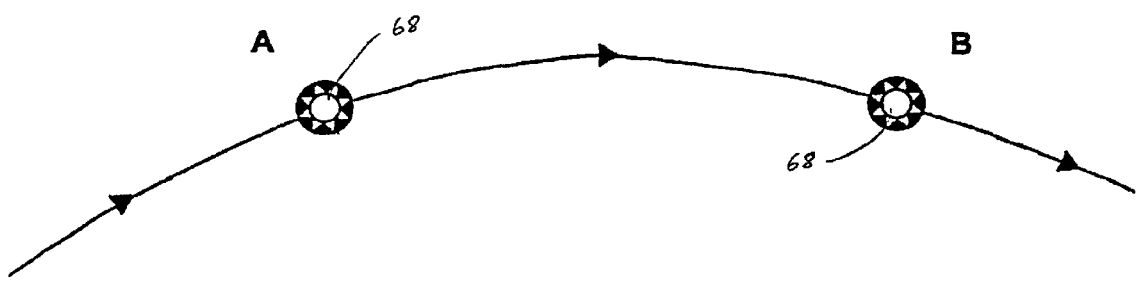
FIG. 7C is a plan view of variable positioning of the solar reflector about a VOT.
Figure 7C:
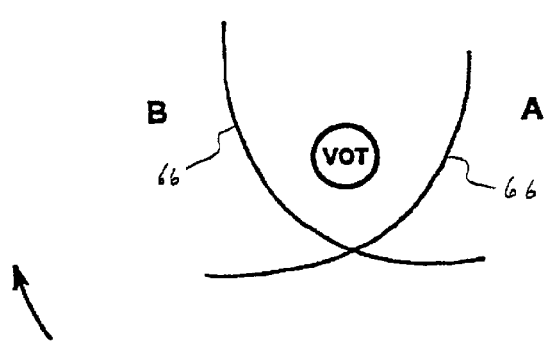

The advantages of the reflector configuration and its adjustability are clearly shown in FIGS. 7A–7C. FIG. 7A shows that the upper and lower reflective surfaces, 210 and 212, respectively, are disposed at different vertical angles relative to the sun 70 due to their varying vertical position with respect to the VOT. FIG. 7B shows a plan view of the collector/reflector 66 located in its horizontal position with respect to the VOT. By virtue of the gravitational pull on the straps 216 and flexible rods 217, the curved reflective surface 200 naturally assumes a semi-elliptical form, which reflects solar radiation onto the sides of the VOT oriented away from the sun. It will be apparent that as the sun moves across the sky during any given day, the position of the collector/reflector 66 must also change for optimal exposure. FIG. 7C shows the collector/reflector in position A when the sun 220 is in position A, and in position B when the sun is in position B.

In the preferred embodiment, a pyranometer 226 with a light sensor (e.g. LiCor LI-250 Light Meter) may be attached to some part of the frame 204 to allow a user to measure the solar flux reaching the reflective surfaces. This allows a user to optimally orient and configure the reflector 66 for maximum solar efficiency for any given situation. The net effective solar energy received by a VOT can be estimated by knowing the incoming (ambient) solar flux, the reflectance of the reflective surface, a light concentration factor (usually estimated), and the surface area of the VOT being impinged with concentrated light. As noted above, the inventor has calculated a theoretical maximum concentration factor $f_c$ of 10 for the configuration used in the trial run. The concentration factor is defined as the ratio of the net reflective surface area to the VOT surface area being impinged by concentrated light. In practice, the realized value of $f_c$ will be less than the theoretical maximum value, and will depend largely on the available reflective surface area, the distance between the reflective area and the VOT, the shape and dimensions of the VOT, and the precision with which the reflector elements are aligned with the VOT.

Figure 8:
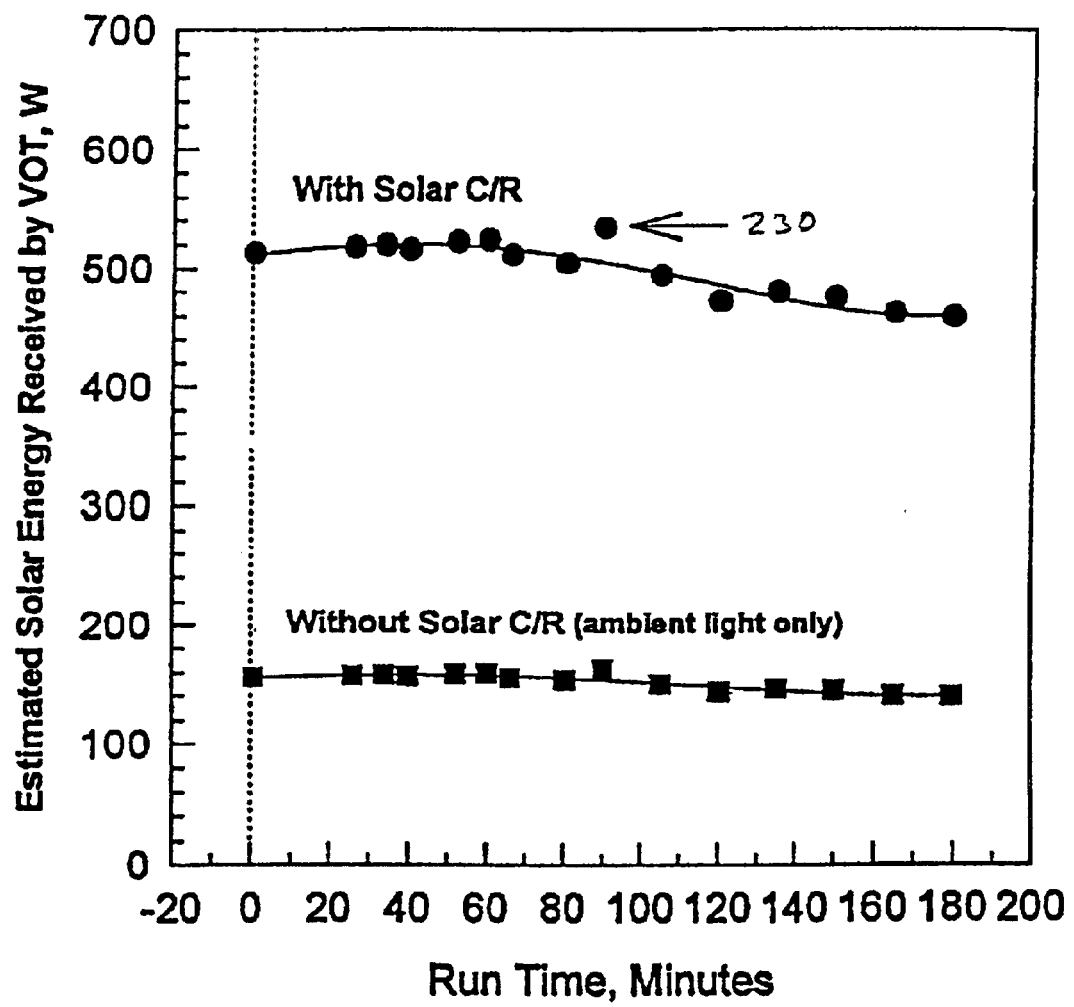
FIG. 8 is a graph of the estimated effective solar energy received by the VOT during the trial run.

A graph of the estimated effective solar energy received by the VOT during the trial run is given in FIG. 8. From this graph it can be seen that the solar reflector yielded more than a three-fold increase in the amount of solar energy at the VOT surface. The deviant data point designated 230 was apparently the result of temporarily higher solar reflectance from a nearby building roof during the course of the trial run. During the trial run it was noted that the theoretical maximum $f_c$ was not achieved, although concentrated solar light ($f \approx 3$ to 4 as observed) was delivered to the photoreactor. This was largely due to the reflector requiring frequent manual adjustments to track the position and angle of the sun in relation to the VOT.

It will be apparent that automatic solar tracking and adjustment systems could be incorporated into the reflector system, whereby optimal solar orientation may be maintained continuously as the sun's vertical and horizontal angles change. Likewise, an intelligent control system could be incorporated to provide optimal adjustment of the contour of the reflective surface to maximize the amount of concentrated solar light received by the VOT. For example, a controller receiving feedback from one or more pyranometers and/or light sensors could be configured to control motors or other actuators for automatically pivoting the frame 204 to shorten or lengthen the straps 216, thereby automatically adjusting the shape of the reflector surfaces to maximize reflected light. Other improvements will be apparent to those skilled in the art, particularly through adopting well known advances which have been made in the field of solar collectors, control systems, etc.

The reflector 66 advantageously allows for true 3-dimensional adjustability of the reflective arrays by allowing adjustment of the tilt of the reflector elements, adjustment of the geometry of the support frame, and axial movement of the entire solar array around a VOT. The reflector system thus makes the capture and use of solar energy more practical, and thus more economical, for targets that have previously been viewed as unconventional or non-amenable to solar applications. It also makes the use of solar energy practical in regions where it may otherwise be considered uneconomical. In addition to its use with the disclosed photoreactor and other similar photo-chemical applications, it may also be used for photo-thermal applications (e.g. water heating), as well as photo-optical uses (e.g. providing concentrated solar light to optic fiber bundles for home, commercial, and industrial lighting).

In sum, the invention described herein provides an economical and practical photoreactor which is useful for a wide variety of photocatalytic uses for environmental and industrial applications, as well as photocatalytic precesses which require specific wavelengths of light in concentrated form. Due to its unique hydraulic design, the photocatalyst is managed and recycled within the reactor while providing favorable operating conditions for photo-catalytic processes, thus reducing the cost per gallon for the desired reactions. Additionally, through careful selection of construction materials and design criteria, the photoreactor and associated solar concentrator/reflector maximize the amount of light energy that impinges the reaction zone within the photoreactor.

The inventor has specifically investigated the use of the photoreactor of the present invention for treatment of water to degrade cyanide contamination therein. Other advantageous uses of the invention include both environmental and industrial applications. For example, the invention may be used for remediation of ground and surface waters to remove a variety of organic and inorganic pollutants, rather than prior methods which typically rely upon activated carbon or chemical oxidation processes. The invention may also replace prior electrolytic methods for the production of hydrogen and/or oxygen from water, as is desirable in the transportation and utilities industries for alternate energy sources and power generation. In the electroplating and manufacturing industries, the invention is useful for reuse and destruction of cyanide, recycling of costly chemical reagents such as chelating or complexing agents, for water treatment, and so forth. The photoreactor would replace prior systems which relied upon pH manipulation, chemical oxidation, chelation, liquid-liquid extraction, chemical precipitation, electrowinning, etc. The photoreactor may also be used in a variety of industries to replace various liquid phase processes requiring chemical reagents (e.g. oxidizers) for chemical synthesis. Such an application could bypass some chemical pathways for production of specialty chemicals, thus decreasing sidestream wastes. Other useful applications will be apparent to those skilled in the art.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A system for the continuous use and recapture of a catalyst in liquid, comprising:
   an inlet;
      an upwardly oriented reaction zone coupled to the inlet and including a generally downwardly flowing carrier liquid;
      a flotation chamber including disposed therein a catalyst consisting of buoyant particles, the flotation chamber disposed below and communicating with the reaction zone and configured such that the downward flow velocity of the liquid is reduced upon entering the flotation chamber to a velocity wherein the buoyancy of the catalyst particles causes them to flow upward;
      an outlet coupled to the flotation chamber; and
      an upwardly oriented catalyst recovery chamber coupled above the flotation chamber and containing a catalyst consisting of buoyant particles suspended in the liquid, the catalyst recovery chamber, flotation chamber, and reaction zone configured such that catalyst particles are drawn out of the catalyst recovery chamber into the reaction zone, and are drawn downward with the liquid into the flotation chamber for recycling to the catalyst recovery chamber.

2. The system of claim 1, wherein the reaction zone is substantially vertical.

3. The system of claim 2, further comprising:
   a catalyst recovery inlet disposed at a bottom of the catalyst recovery chamber and approximately centrally located within the flotation chamber; and
   rotational flow structure coupled to the flotation chamber for inducing rotational flow about the center of the flotation chamber, such that the buoyant catalyst particles are urged toward the catalyst recovery inlet to the catalyst recovery chamber.

4. The system of claim 3, wherein the catalyst recovery inlet comprises a downwardly oriented cone having openings formed therein.

5. The system of claim 4, wherein the catalyst recovery inlet further comprises fins disposed on an outer side of the cone, the fins configured to assist catalyst particles in entering the openings formed in the cone.

6. The system of claim 3, wherein the rotational flow structure comprises a magnetic stirrer disposed adjacent the flotation chamber.

7. The system of claim 1, wherein the reaction zone is substantially non-vertical.

8. A photoreactor system, comprising:
   a generally upright outer cylinder;
   an inner cylinder disposed generally coaxially within the outer cylinder and defining an annular reaction zone therebetween, the inner cylinder having an inlet at a bottom thereof for allowing inflow of buoyant photocatalyst particles, and an orifice disposed at a top thereof for allowing outflow of the buoyant photocatalyst particles into downwardly flowing liquid in the reaction zone;
   means for directing light into the reaction zone, whereby the photocatalyst particles may induce photo-chemical reactions within the liquid; and
   a flotation chamber communicating with and disposed at a bottom of the outer cylinder and configured to substantially reduce the flow velocity of the liquid upon exiting the annular reaction zone to a velocity wherein the buoyant photocatalyst particles are allowed to float upward through the inlet of the inner cylinder.

9. The photoreactor of claim 8, further comprising means for inducing rotational flow in the flotation chamber about the center of the flotation chamber, such that the buoyant photocatalyst particles are urged toward the inlet to the catalyst recovery chamber.

10. The photoreactor of claim 9, wherein the means for inducing rotational flow is selected from the group consisting of a magnetic stirrer disposed adjacent the flotation chamber and spiral vanes disposed within the annular reaction zone.

11. The photoreactor of claim 8, wherein the photocatalyst is selected from the group consisting of zinc oxide (ZnO) and titanium dioxide ($TiO_2$).

12. The photoreactor system of claim 8 wherein:
   the liquid comprises cyanide contaminated water;
   the inlet to the inner cylinder comprises a downwardly oriented perforated cone approximately centrally located within the flotation chamber;
   the means for directing light into the reaction zone comprises a variable contour reflector; and further comprising:
   a water inlet for introducing the liquid into the top of the photoreactor;
   means for inducing rotational flow around the perforated cone such that the buoyant photocatalyst particles are urged toward the cone; and
   a water outlet at a bottom of the flotation chamber for removing treated water.

13. The system of claim 12, wherein the photocatalyst comprises buoyant ceramic beads coated with titanium dioxide.

14. The system of claim 13, wherein the coated beads are from approximately 100 $\mu$m to 300 $\mu$m in diameter.

15. The system of claim 12, wherein the variable contour reflector comprises:
   a movable frame having two side portions;
   a central connecting member pivotally connecting the side portions of the frame;
   at least two flexible straps attached between the side portions of the frame, the location of attachment being spaced from the central connecting member; and
   a plurality of substantially vertical reflecting members disposed upon the straps having their reflective surfaces generally commonly oriented, forming a curved mosaic reflective surface;
   whereby a user may adjust the contour of the reflective surface by pivoting the side portions of the frame so as to adjust the curvature of the straps.

16. A method of recapturing photocatalyst particles in a liquid, comprising:

flowing a liquid downwardly through a reaction zone;

introducing buoyant photocatalyst particles into the downwardly flowing liquid, such that the photocatalyst particles are drawn downward through the reaction zone with the flowing liquid; and recycling the particles through a catalyst recovery chamber by reducing the downward flow velocity of the liquid beyond a bottom of the reaction zone, such that the buoyant photocatalyst particles are allowed to float upward through the catalyst recovery chamber to the reaction zone for reintroduction into the downwardly flowing liquid.

17. The method of claim 16, further comprising:

directing light into the reaction zone such that the photocatalyst particles may promote chemical reactions within the liquid.

18. The method of claim 16, wherein reducing the downward flow velocity of the liquid beyond the reaction zone further comprises discharging the liquid into a flotation chamber below the reaction zone, the flotation chamber having dimensions such that the velocity of the flowing liquid is substantially reduced from the downward velocity of the liquid in the reaction zone.

19. The method of claim 18, further comprising:

inducing rotational flow of the liquid about the center of the flotation chamber, such that the buoyant photocatalyst particles are urged toward an inlet to a catalyst recovery chamber approximately centrally disposed within the flotation chamber.

20. The method of claim 18, further comprising:

withdrawing the liquid from the flotation chamber.

* * * * *